(12) United States Patent
Malka et al.

(10) Patent No.: US 8,996,336 B2
(45) Date of Patent: Mar. 31, 2015

(54) METHOD, TOOL, AND DEVICE FOR ASSEMBLING A PLURALITY OF PARTIAL FLOOR PLANS INTO A COMBINED FLOOR PLAN

(76) Inventors: Francis Ruben Malka, St-Lambert (CA); Gilles Jean Desforges, St-Lambert (CA)

( * ) Notice: Subject to any disclaimer, the term of this patent is extended or adjusted under 35 U.S.C. 154(b) by 203 days.

(21) Appl. No.: 13/077,938

(22) Filed: Mar. 31, 2011

(65) Prior Publication Data
US 2012/0253751 A1 Oct. 4, 2012

(51) Int. Cl.
*G06F 17/50* (2006.01)
*G01C 15/00* (2006.01)
*G01S 17/08* (2006.01)

(52) U.S. Cl.
CPC ............... *G01C 15/00* (2013.01); *G06F 17/50* (2013.01); *G06F 17/5004* (2013.01); *G06F 2217/02* (2013.01); *G06F 2217/04* (2013.01); *G01S 17/08* (2013.01)
USPC ............................................................ 703/1

(58) Field of Classification Search
None
See application file for complete search history.

(56) References Cited

U.S. PATENT DOCUMENTS

| 7,039,569 B1 * | 5/2006 | Haws et al. ........................ 703/7 |
| 8,260,581 B2 * | 9/2012 | Hoguet ............................. 703/1 |
| 2008/0126020 A1 * | 5/2008 | Hoguet ............................. 703/1 |
| 2008/0126022 A1 * | 5/2008 | Hoguet ............................. 703/1 |
| 2010/0198563 A1 * | 8/2010 | Plewe ............................... 703/1 |

OTHER PUBLICATIONS

"Physically Based Simulation Model for Acoustic Sensor Robot Navigation", Kuc et al. IEEE Transactions on Pattern Analysis and Machine Intelligence, vol. PAMI-9, No. 6, Nov. 1987.*
Williams et al: "Structure Mapping for Improved Situation Awareness, Misson Planning, and Operator Tracking", SPIE vol. 7666, 2010, abstract, pp. 2, 3, 8, 10, fig. 2, 14, 15.

* cited by examiner

*Primary Examiner* — Hugh Jones
*Assistant Examiner* — Nithya J Moll (57) ABSTRACT

A method, tool, and device for assembling a plurality of partial floor plans into a combined floor plan by means of an electronic device. The method involves positioning partial floor plans relatively one to another, pairing substantially aligned walls, and computing modified partial floor plans that can be assembled into a combined floor plan.

15 Claims, 4 Drawing Sheets

METHOD, TOOL, AND DEVICE FOR ASSEMBLING A PLURALITY OF PARTIAL FLOOR PLANS INTO A COMBINED FLOOR PLAN

BACKGROUND OF THE INVENTION

1. Field of the Invention

The present invention relates to floor plans.

2. Description of the Prior Art

Floor plans of existing buildings are made using distance measurement tools. These tools vary in complexity and precision. An example of a distance measurement tool is the tape measure, which requires manually extending a ruler between two points and reading the distance that aligns with the second point. Another example of a distance measurement tool is the laser distance meter, which sends a laser pulse in a narrow beam towards the object and measure the time taken by the pulse to be reflected off the target and returned to the device.

During the measuring phase, measurements are typically grouped by floor, by room, or by some other criteria that simplifies assigning them to floors, walls, doors, and windows on a floor plan. This grouping often yields partial floor plans, which then have to be assembled into a complete floor plan.

No matter how precise the measurements, many factors may prevent partial floor plans from fitting seamlessly together. For instance, one may read different measures when measuring a wall from one side and the other; room corner angles are seldom square in reality even though they were meant to be; wall thickness is not uniform, often hiding plumbing, wires, ventilation ducts, or structural elements not apparent to the eye; floors and ceilings are not always parallel, as is the case for opposing walls; construction materials compress and stretch over time, distorting building structure.

Floor plans were traditionally drawn by hand. They are now mostly drawn using specialized computer software. An example of specialized software is Visio, which allows drawing walls and adding furniture using a mouse and a computer running Windows. Another example of specialized software is Autocad, which allows creating detailed floor plans including of electrical wiring and plumbing layout. Specialized software typically requires that the user input measurements. It does not attempt to correct measurement errors, nor does it attempt to make various portions of a floor plan fit together.

When assembling multiple partial floor plans, users have to adjust measurements manually to prevent floor gaps and overlaps in order to ensure consistency of the overall plan. For instance, one may force almost-square angles into square angles, even out wall thickness, spread measurement errors over multiple walls or rooms, average out multiple measurements that should have been equal, or make substantially aligned walls perfectly parallel.

The changes made to partial floor plans in order to make them fit into a combined floor plan introduce local deformations to walls, doors, and windows. An alternate way to look at the problem at hand is to view these deformations as tensions that need to be relaxed. The greater the deformation and the higher the concentration of deformations in a given area of the floor plan, the greater the induced tension. Spreading a few local deformations over a large number of walls and over a greater area relaxes these tensions and improves the overall floor plan consistency.

Some drawing software packages offer tools that help during the drawing process, allowing user to snap points on a grid or align walls horizontally or vertically using a mouse.

SUMMARY OF THE INVENTION

In an aspect of the invention, there is provided a method for assembling a plurality of partial floor plans into a combined floor plan by means of an electronic device. The method comprises positioning all partial floor plans relatively one to another, pairing substantially aligned walls, and computing modified partial floor plans that can be assembled into a combined floor plan. In specific embodiments, the method may also comprise capturing user input from an input unit for positioning partial floor plans or pairing substantially aligned walls.

In another aspect of the invention, a device for assembling a plurality of partial floor plans into a combined floor plan is provided. The device comprises a positioning unit for positioning all partial floor plans relatively one to another, a pairing unit for pairing substantially aligned walls, an assembly unit for computing modified partial floor plans that can be assembled into a combined floor plan, and, optionally, an input unit for capturing user input which is used for positioning partial floor plans or pairing substantially aligned walls.

In another aspect of the invention, a tool for assembling a plurality of partial floor plans into a combined floor plan, adapted to run on an electronic device, is provided. The tool comprises a positioning unit for positioning all partial floor plans relatively one to another, a pairing unit for pairing substantially aligned walls, an assembly unit for computing modified partial floor plans that can be assembled into a combined floor plan, and, optionally, an input unit for capturing user input which is used for positioning partial floor plans or pairing substantially aligned walls.

DESCRIPTION OF THE PREFERRED EMBODIMENTS

Figure 1:
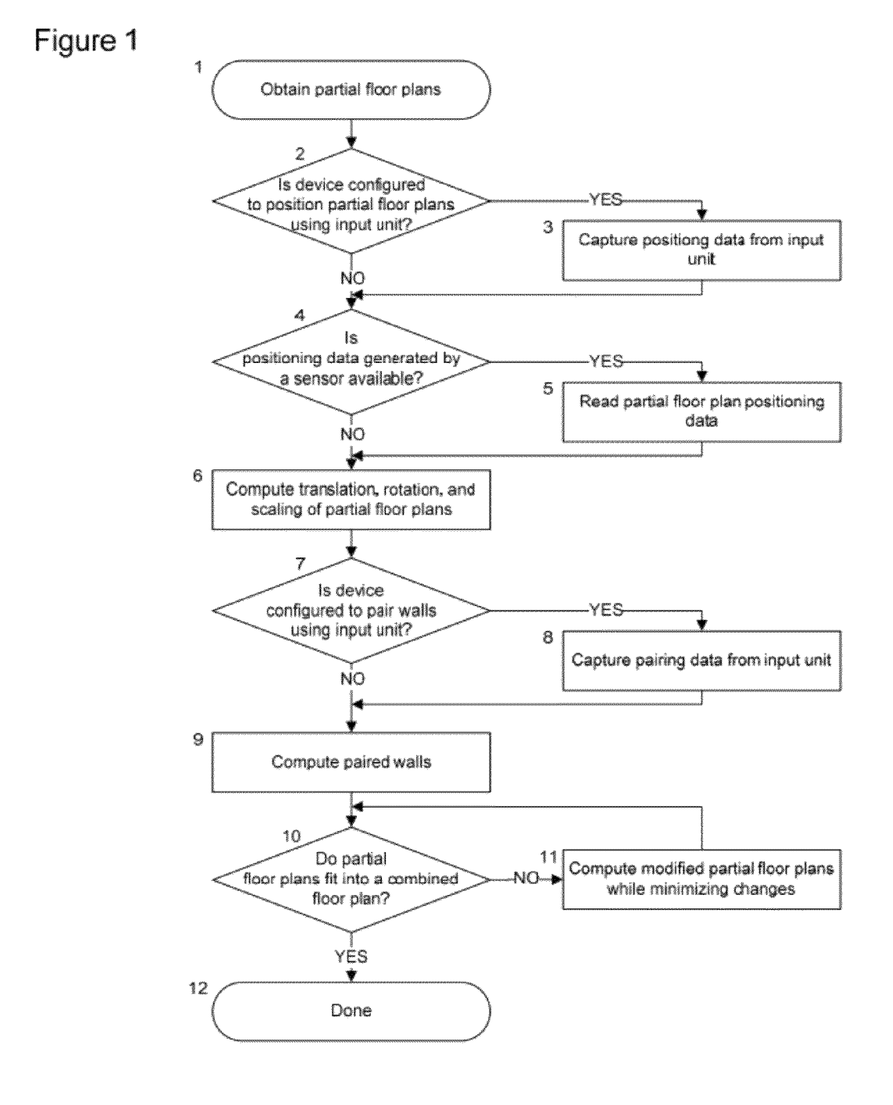
FIG. 1 is an example of a simplified flow chart representing the various steps of the method.

Reference is now made to FIG. 1, wherein there is shown an example of a simplified flow diagram describing the various steps of the method.

According to one of the preferred embodiments of the invention, capturing positioning data from an input unit 3 and reading partial floor plan positioning data 5 can be performed in any order, even simultaneously.

According to another preferred embodiment of the invention, the positioning data captured from an input unit 3 comprises a translation, a rotation, and a scaling for each partial floor plan. The translation and the rotation may be absent or equal to zero if there is no need to translate or rotate the partial floor plan. Similarly, the scaling may be absent or equal to one if there is no need to scale the partial floor plan.

According to another preferred embodiment of the invention, the positioning unit makes a first attempt at computing a translation, a rotation, and a scaling 6 in order to determine if capturing positioning data from an input unit 3 is necessary. If the positioning unit is capable of positioning a partial floor plan on its own, the user is not prompted to input positioning data.

According to another preferred embodiment of the invention, pairing data captured from input unit 8 comprises information that indicates that two given walls must be parallel or aligned. The pairing data may also comprise information that indicates that two given walls must not be parallel or aligned.

According to another preferred embodiment of the invention, pairing data captured from input unit 8 comprises information that indicates that the extremity of a wall must be on a straight line extending another wall. The pairing data may also comprise information that indicates that the extremities a wall must not be on a straight line extending another wall.

According to another preferred embodiment of the invention, computing paired walls 9 favors pairing a wall with the closest wall of an adjacent partial floor plan.

Two walls are considered substantially close when they are within 50 cm one of another. Some embodiments of the invention may use a higher threshold to achieve a more aggressive pairing when measurement errors are higher, or a lower threshold when measurements are more precise.

According to another preferred embodiment of the invention, computing paired walls 9 favors pairing a wall with the wall of an adjacent partial floor plan that is closest to being parallel.

Two walls are considered substantially aligned when the angle formed by the lines going through both walls is equal to or less than 15 degrees. Some embodiments of the invention may use a higher threshold to achieve a more aggressive pairing when measurement errors are higher, or a lower threshold when measurements are more precise.

According to another preferred embodiment of the invention, computing paired walls 9 pairs walls in a way that minimizes gaps and overlaps of partial floor plans.

According to another preferred embodiment of the invention, computing paired walls 9 pairs walls in a way that maximizes the number of paired walls or the total length of paired walls.

According to another preferred embodiment of the invention, computing paired walls 9 pairs walls by aligning doors and interior windows of a partial floor plan with those of another partial floor plan.

According to another preferred embodiment of the invention, a wall may be paired with multiple walls, each one being in a distinct adjacent floor plan.

According to another preferred embodiment of the invention, computing paired walls 9 selects the walls to pair using a Monte Carlo method, particle swarm optimization, Newton's method, a quasi-Newton's method, a gradient descent or ascent, a genetic algorithm, a simplex algorithm, simulates annealing, or a combination of the above.

According to another preferred embodiment of the invention, determining whether partial floor plans fit into a combined floor plan 10 minimizes the overall change in length, in position, or in orientation of walls. Alternatively, a maximum threshold may have an effect similar to the minimization in keeping the change in length, in position, or in orientation within an acceptable range.

According to another preferred embodiment of the invention, determining whether partial floor plans fit into a combined floor plan 10 minimizes the overall change in area or in position of rooms present in the partial floor plans.

According to another preferred embodiment of the invention, computing modified partial floor plans 11 may translate, rotate, and scale walls, doors and windows in order to achieve the best fit. Walls, doors, and interior windows may also be inserted or removed in the process. Properties such as wall thickness, window types, and door types may be changed when merging walls in order to improve the consistency of the combined floor plan.

According to another preferred embodiment of the invention, the step of computing modified partial floor plans 11 assembles the partial floor plans while maximizing a fitness function that minimizes changes to wall dimensions, to wall orientation, to the relative position of rooms, or to room areas.

According to another preferred embodiment of the invention, computing modified partial floor plans 11 minimizes changes to the partial floor plans using a Monte Carlo method, particle swarm optimization, Newton's method, a quasi-Newton's method, a gradient descent or ascent, a genetic algorithm, a simplex algorithm, simulates annealing, or a combination of the above.

According to another preferred embodiment of the invention, a partial floor plan may consist in a few wall segments, a whole room, or multiple rooms.

According to another preferred embodiment of the invention, a user indicates by means of the input unit that a gap between two or more partial floor plans needs to be filled with a new room that is not present in the partial floor plans. The assembly unit generates the new room by connecting the walls adjacent to the gap, closing open extremities of the gap if necessary. All doors and interior windows on walls adjacent to the gap now give access to this new room.

According to another preferred embodiment of the invention, the assembly unit determines that closing a gap between two or more partial floor plans would create deformations or tensions that are above a given tolerance threshold. The assembly unit thus fills the gap with a new room that is not present in the partial floor plans. The assembly unit generates the new room by connecting the walls adjacent to the gap, closing open extremities of the gap if necessary. All doors and interior windows on walls adjacent to the gap now give access to this new room.

Figure 2:
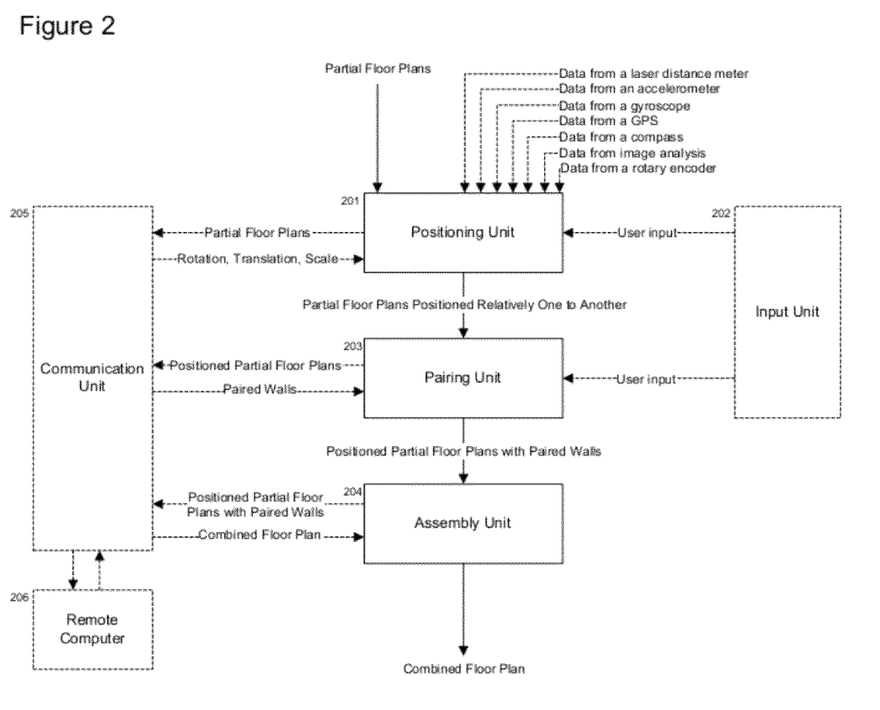
FIG. 2 is an example of a simplified representation of the flow of information inside the device components, namely a positioning unit, a pairing unit, an assembly unit, and, optionally, an input unit, a communication unit, and a remote computer.

Reference is now made to FIG. 2, wherein there is shown an example of a simplified representation of the flow of information inside the device components, namely a positioning unit 201, a pairing unit 203, an assembly unit 204, and, optionally, an input unit 202, a communication unit 205, and a remote computer 206.

According to one of the preferred embodiments of the invention, the positioning unit 201 positions partial floor plans relatively one to another using user input captured by means of an input unit 202.

According to another preferred embodiment of the invention, the input unit 202 comprises a touch screen allowing the user to input information using one finger, many fingers, or a stylus.

According to another preferred embodiment of the invention, the input unit 202 comprises a microphone coupled with a processor in order to perform voice analysis and command detection.

According to another preferred embodiment of the invention, the input unit 202 comprises a hardware or software keyboard.

According to another preferred embodiment of the invention, the input unit 202 comprises a pointing device such as a mouse, a trackball, or a joystick.

According to another preferred embodiment of the invention, the device also has a screen to give the user visual feedback while positioning partial floor plans or pairing walls.

According to another preferred embodiment of the device, the device is a portable device such as a cellular phone, a smartphone, a laser meter, a PDA (Personal Digital Assistant), a tablet, a digital camera, or a laptop computer.

According to another preferred embodiment of the invention, the device 205 performs all or part of its computations by means of a remote computer 206. The device may be connected to the remote computer wirelessly or with a cable. The remote computer 206 may be situated near the device, allowing communication protocols such as Bluetooth or Wifi to be used, or it may be in a remote location, in which case it can be accessed via the Internet.

Figure 3:
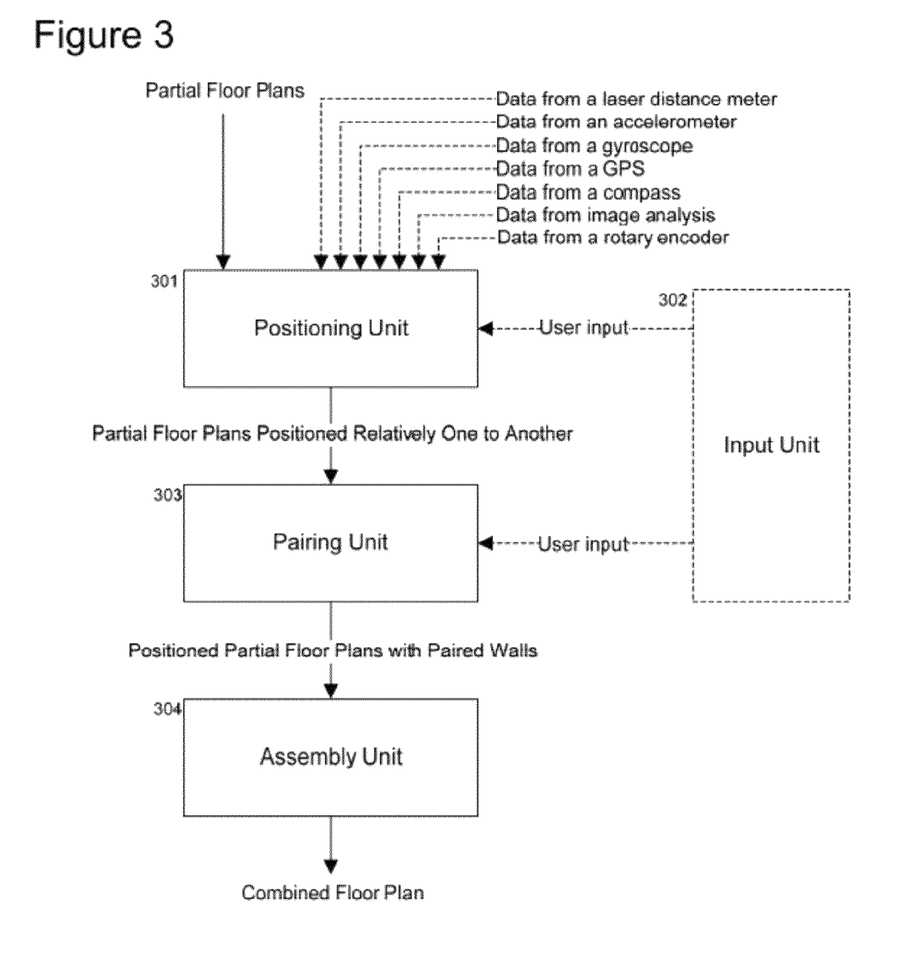
FIG. 3 is an example of a simplified representation of the components of the tool, namely a positioning unit, a pairing unit, an assembly unit, and, optionally, an input unit.

Reference is now made to FIG. 3, wherein there is shown an example of a simplified representation of the components of the tool, namely a positioning unit 301, a pairing unit 303, an assembly unit 304, and, optionally, an input unit 302.

According to one of the preferred embodiments of the invention, the tool is downloaded onto the device using a memory card, a memory stick, a cable connected to a computer, a cable connected to a network, or a wireless network connection.

According to another preferred embodiment of the invention, the tool is integrated with the device, either as a pre-installed application or an extension of the operating system. The application may be stored in ROM (Read-Only Memory) or implemented using electronic components.

According to another preferred embodiment of the invention, the tool is adapted to run on a portable device such as a cellular phone, a smartphone, a laser meter, a PDA (Personal Digital Assistant), a tablet, a digital camera, or a laptop computer.

According to another preferred embodiment of the invention, the tool reads the partial floor plans from a persistent storage located on the device.

According to another preferred embodiment of the invention, the tool reads the positioning data from a persistent storage located on the device.

According to another preferred embodiment of the invention, the positioning data is contained inside or attached to the partial floor plans.

According to another preferred embodiment of the invention, the tool previously captured the data directly from a laser distance meter, from an accelerometer, from a gyroscope, from a GPS, from a compass or from image analysis and already has this data available in RAM (random-access memory).

According to another preferred embodiment of the invention, the positioning unit 301 receives positioning data generated by a laser distance meter along with the partial floor plans. The laser distance meter measures the distance between a first partial floor plan and a reference point, followed by the distance between a second partial floor plan and the same reference point. The reference point may lie inside or outside the partial floor plans. These distances are then used to compute the translation and the rotation necessary to position the partial floor plans relatively one to another.

According to another preferred embodiment of the invention, the positioning unit 301 receives positioning data generated by an accelerometer along with the partial floor plans. The accelerometer measures its inclination with respect to gravity and changes in acceleration along three axes. Integrating acceleration changes over time allows determining the movements of the user in all directions with respect to time. Assuming that the user carried the accelerometer from the location represented on a first partial floor plan to the location represented on a second partial floor plan, the integration of the accelerometer data is used to compute the translation and the rotation of the partial floor plans relatively one to another. Precision depends on the quality of the accelerometer, the sampling frequency, and the algorithm used to compute the position.

According to another preferred embodiment of the invention, the positioning unit 301 receives positioning data generated by a gyroscope and an accelerometer along with the partial floor plans. Integrating acceleration changes over time while reading a direction from the gyroscope allows determining the movement of the user in a specific direction with respect to time. Assuming that the user carried a device comprising an accelerometer and a gyroscope from the location represented on a first partial floor plan to the location represented on a second partial floor plan, the integration of the accelerometer data in the direction indicated by the gyroscope is used to compute the translation and the rotation of the partial floor plans relatively one to another. Precision depends on the quality of the accelerometer, the sampling frequency, and the algorithm used to compute the position.

According to another preferred embodiment of the invention, the positioning unit 301 receives positioning data generated by a gyroscope along with the partial floor plans. The gyroscope measures the angle between a first partial floor plan and a reference point, followed by the angle between a second partial floor plan and the same reference point. The reference point may lie inside or outside the partial floor plans. These angles are then used to compute the translation and the rotation necessary to position the partial floor plans relatively one to another. Precision depends on the quality of the gyroscope, the sampling frequency, and the algorithm used to compute the angles.

According to another preferred embodiment of the invention, the positioning unit 301 receives positioning data generated by a compass along with the partial floor plans. The compass measures the angles between the partial floor plans and a cardinal orientation. These angles are then used to determine the absolute orientation of each partial floor plan and compute the rotation necessary to position them relatively one to another. Precision depends on the quality of the compass, electromagnetic interference, and the algorithm used to compute the rotation.

According to another preferred embodiment of the invention, the positioning unit 301 receives positioning data generated by a GPS (Global Positioning System) along with the partial floor plans. A GPS measures its absolute latitude, longitude, and altitude, allowing determining the absolute position and altitude of each floor plan and computing the rotation and the translation necessary to position the partial floor plans relatively one to another. The altitude can be used to determine on what floor the partial floor plan was captured. Precision depends on the quality of the GPS, the number of satellites visible at the location, the latitude of the location, and the algorithm used to compute the translation.

According to another preferred embodiment of the invention, the positioning unit 301 receives positioning data that is the result of image analysis along with the partial floor plans. Image analysis extracts features from a picture or a video stream. These features can help identify structural elements such as doors, windows, walls, floors, and ceilings. Assuming that the image analysis is performed on a picture or a video stream taken on the location represented on the partial floor plans, the distance between these structural elements and their orientation is then used to compute the translation and the rotation necessary to position the partial floor plans relatively one to another. Precision depends on the resolution if the camera, the aperture angle of the camera, the ambient light, and the algorithm used to compute the translation.

According to another preferred embodiment of the invention, the positioning unit 301 receives positioning data that is the result of image analysis along with the partial floor plans. Image analysis determines if the same object is visible from multiple rooms, giving a clue as to how the partial floor plans are to be assembled. Precision depends on the resolution if the camera, the aperture angle of the camera, the ambient light, and the algorithm used to compute the translation.

According to another preferred embodiment of the invention, the pairing unit 303 outputs paired walls connected by strong links or weak links. The determination of the link strength can be based on a geometric property of the walls, such as their distance, their alignment, the correspondence of their doors and interior windows, or on user input captured by means of the input unit 302. Wall pairs connected by a strong link have the ability to survive the assembly process even if the combined plan induces a great tension between their respective partial floor plans, whereas those connected by weak links can be separated by the assembly unit 304 if the tension between their respective partial floor plans exceeds a certain threshold.

Figure 4:
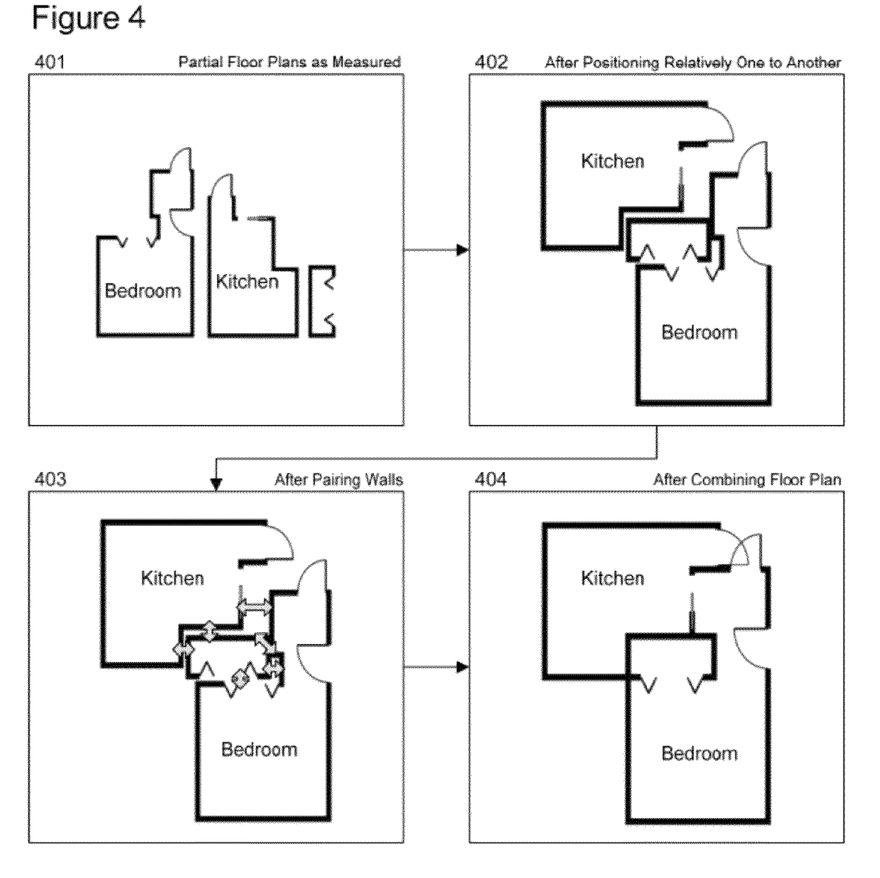
FIG. 4 illustrates how sample partial floor plans may be positioned relatively one to another, how their walls may be paired, and how they can then be assembled into a combined floor plan.

Reference is now made to FIG. 4, which illustrates how sample partial floor plans 401 may be positioned relatively one to another 402, how their walls may be paired 403, and how they can then be assembled into a combined floor plan 404.

According to one of the preferred embodiments of the invention, walls are translated, rotated, or scaled in order to relax tensions, to improve consistency, to spread measurement error, to increase overall alignment or orthogonality of walls, doors, and interior windows in the combined floor plan 404.

According to another preferred embodiment of the invention, partial floor plans are translated, rotated, and scaled 402 by a user using a touch screen or a mouse while modifications are displayed on a screen.

According to another preferred embodiment of the invention, substantially aligned walls are paired 403 by a user using a touch screen or a mouse while modifications are displayed on a screen.

According to another preferred embodiment of the invention, a wall is inserted into or removed from a partial floor plan in order to match the wall configuration of the adjacent floor plan 404.

According to another preferred embodiment of the invention, a door or an interior window is translated, rotated, or scaled in order to align with a corresponding door or interior window present in the paired wall 404.

According to another preferred embodiment of the invention, an exterior window prevents the wall it is on from being paired with a wall in an adjacent partial floor plan, thus ensuring that the exterior window remains on an exterior wall.

According to another preferred embodiment of the invention, a door or an interior window is inserted or removed, or have its properties changed in order to match the configuration of doors and interior windows present in the paired wall 404.

According to another preferred embodiment of the invention, the combined floor plan may contain gaps or discontinuities. The assembly may thus generate multiple combined floor plans.

According to another preferred embodiment of the invention, the floor plan is never actually drawn or represented visually by the device, the tool, or the method. The floor plan is only manipulated as data, such as a set of points, coordinates, matrices, or an array of floating point numbers. This data can be stored in an XML file, a database, or a file readable by a CAD software.

What is claimed is:

1. A method for assembling a plurality of partial floor plans into a combined floor plan by means of an electronic device, the method comprising:
   positioning the partial floor plans relatively one to another;
   automatically pairing a wall of one of the partial floor plans with a substantially aligned and substantially close wall of another partial floor plan without user input by means of a processor of the electronic device;
   automatically computing an optimized orientation of the paired walls by minimizing an angle between the paired walls and rotating both paired walls to the optimized orientation without user input by means of the processor;
   automatically computing an optimized position of the paired walls by minimizing a distance between the paired walls and translating both paired walls to the optimized position without user input by means of the processor;
   automatically computing an optimized length of the paired walls by minimizing a distance between the extremities of the paired walls and setting the length of both paired walls to the optimized length without user input by means of the processor; and
   assembling the partial floor plans into a combined floor plan by means of the processor.

2. The method of claim 1, wherein the positioning of the partial floor plans relatively one to another is performed by computing a translation, a rotation, or a scaling of each partial floor plan using at least one of the following:
   a distance between two walls;
   an angle between two walls;
   a similarity in shape of a series of walls contained in two of the partial floor plans;
   an alignment of an interior door or opening with a corresponding interior door or opening in another partial floor plan;
   an exterior door or opening preventing its supporting wall from being paired with a wall of another partial floor plan;
   a distance between one of the partial floor plans and a reference point measured using data read from a laser distance meter;
   a path between two of the partial floor plans computed by integrating data read from an accelerometer over time;
   an orientation of one of the partial floor plans relative to the magnetic or geographic north measured using a compass;
   a latitude, a longitude, or an altitude of one of the partial floor plans measured using data read from a GPS;
   an angle between one of the partial floor plans and a reference point measured using data read from a gyroscope or a rotary encoder;
   a direction along a path between two of the partial floor plans identified using data read from a gyroscope or a rotary encoder;
   user input captured by means of an input unit; and
   a reference object identified using image analysis on several images of a location represented on the floor plan.

3. The method of claim 1, wherein the pairing of a wall of one of the partial floor plans with a substantially aligned and substantially close wall of another partial floor plan comprises at least one of the following:
  minimizing a difference in length between the two paired walls;
  minimizing a displacement of the partial floor plans;
  minimizing an overlap of the partial floor plans;
  minimizing a gap between the partial floor plans;
  maximizing the number of paired walls;
  maximizing an alignment of doors or interior openings present in two paired walls;
  favoring or forcing the pairing of two walls selected by means of an input unit;
  disfavoring or preventing the pairing of two walls selected by means of an input unit; and
  maximizing a fitness function combining several of the above.

4. The method of claim 1, wherein the partial floor plans are made more compatible by further performing at least one of the following:
  translating a wall, a door, or an opening;
  rotating a wall, a door, or an opening;
  deforming a wall, a door, or an opening;
  changing a property of a wall, a door, or an opening;
  inserting a wall, a door or an opening; and
  removing a wall, a door or an opening.

5. The method of claim 1, wherein the device further comprises a communication unit for performing portions of at least one of the following computations on a remote computer:
  positioning the partial floor plans relatively one to another;
  pairing a wall of one of the partial floor plans with a substantially aligned and substantially close wall of another partial floor plan;
  computing an optimized orientation of the paired walls by minimizing an angle between the paired walls and rotating both paired walls to the optimized orientation;
  computing an optimized position of the paired walls by minimizing a distance between the paired walls and translating both paired walls to the optimized position;
  computing an optimized length of the paired walls by minimizing a distance between the extremities of the paired walls and setting the length of both paired walls to the optimized length; and
  assembling the partial floor plans into a combined floor plan.

6. A device for assembling a plurality of partial floor plans into a combined floor plan, the device comprising:
  a positioning unit for positioning the partial floor plans relatively one to another;
  a pairing unit for automatically pairing a wall of one of the partial floor plans with a substantially aligned and substantially close wall of another partial floor plan without user input;
  an assembly unit for automatically performing without user input by means of a processor of the device:
    computing an optimized orientation of the paired walls by minimizing an angle between the paired walls and rotating both paired walls to the optimized orientation;
    computing an optimized position of the paired walls by minimizing a distance between the paired walls and translating both paired walls to the optimized position;
    computing an optimized length of the paired walls by minimizing a distance between the extremities of the paired walls and setting the length of both paired walls to the optimized length; and
    assembling the partial floor plans into a combined floor plan.

7. The device of claim 6, wherein the positioning unit positions the partial floor plans relatively one to another by computing a translation, a rotation, or a scaling of each partial floor plan using at least one of the following:
  a distance between two walls;
  an angle between two walls;
  a similarity in shape of a series of walls contained in two of the partial floor plans;
  an alignment of an interior door or opening with a corresponding interior door or opening in another partial floor plan;
  an exterior door or opening preventing its supporting wall from being paired with a wall of another partial floor plan;
  a distance between one of the partial floor plans and a reference point measured using data read from a laser distance meter;
  a path between two of the partial floor plans computed by integrating data read from an accelerometer over time;
  an orientation of one of the partial floor plans relative to the magnetic or geographic north measured using a compass;
  a latitude, a longitude, or an altitude of one of the partial floor plans measured using data read from a GPS;
  an angle between one of the partial floor plans and a reference point measured using data read from a gyroscope or a rotary encoder;
  a direction along a path between two of the partial floor plans identified using data read from a gyroscope or a rotary encoder;
  user input captured by means of an input unit; and
  a reference object identified using image analysis on several images of a location represented on the floor plan.

8. The device of claim 6, wherein the pairing unit performs at least one of the following:
  minimizing a difference in length between the two paired walls;
  minimizing a displacement of the partial floor plans;
  minimizing an overlap of the partial floor plans;
  minimizing a gap between the partial floor plans;
  maximizing the number of paired walls;
  maximizing an alignment of doors or interior openings present in two paired walls;
  favoring or forcing the pairing of two walls selected by means of an input unit;
  disfavoring or preventing the pairing of two walls selected by means of an input unit; and
  maximizing a fitness function combining several of the above.

9. The device of claim 6, wherein the assembly unit makes the partial floor plans more compatible by further performing at least one of the following:
  translating a wall, a door, or an opening;
  rotating a wall, a door, or an opening;
  scaling a wall, a door, or an opening;
  changing a property of a wall, a door, or an opening;
  inserting a wall, a door or an opening; and
  removing a wall, a door or an opening.

10. The device of claim 6, further comprising a communication unit for performing portions of at least one of the following computations on a remote computer:
  positioning the partial floor plans relatively one to another;
  pairing a wall of one of the partial floor plans with a substantially aligned and substantially close wall of another partial floor plan;

computing an optimized orientation of the paired walls by minimizing an angle between the paired walls and rotating both paired walls to the optimized orientation:

computing an optimized position of the paired walls by minimizing a distance between the paired walls and translating both paired walls to the optimized position;

computing an optimized length of the paired walls by minimizing a distance between the extremities of the paired walls and setting the length of both paired walls to the optimized length; and assembling the partial floor plans into a combined floor plan.

11. A computer-implementable tool for assembling a plurality of partial floor plans into a combined floor plan, the tool comprising instructions that can be downloaded electronically or wirelessly to and executed on an electronic device, the tool comprising:

a positioning unit for positioning the partial floor plans relatively one to another;

a pairing unit for pairing a wall of one of the partial floor plans with a substantially aligned and substantially close wall of another partial floor plan without user input;

an assembly unit for automatically performing without user input by means of a processor of the device:

computing an optimized orientation of the paired walls by minimizing a difference in angle between the paired walls and rotating both paired walls to the optimized orientation;

computing an optimized position of the paired walls by minimizing a distance between the paired walls and translating both paired walls to the optimized position;

computing an optimized length of the paired walls by minimizing a distance between the extremities of the paired walls and setting the length of both paired walls to the optimized length; and assembling the partial floor plans into a combined floor plan.

12. The tool of claim 11, wherein the positioning unit positions the partial floor plans relatively one to another by computing a translation, a rotation, or a scaling of each partial floor plan using at least one of the following:

a distance between two walls;

an angle between two walls;

a similarity in shape of a series of walls contained in two of the partial floor plans;

an alignment of an interior door or opening with a corresponding interior door or opening in another partial floor plan;

an exterior door or opening preventing its supporting wall from being paired with a wall of another partial floor plan;

a distance between one of the partial floor plans and a reference point measured using data read from a laser distance meter;

a path between two of the partial floor plans computed by integrating data read from an accelerometer over time;

an orientation of one of the partial floor plans relative to the magnetic or geographic north measured using a compass;

a latitude, a longitude, or an altitude of one of the partial floor plans measured using data read from a GPS;

an angle between one of the partial floor plans and a reference point measured using data read from a gyroscope or a rotary encoder; and a direction along a path between two of the partial floor plans identified using data read from a gyroscope or a rotary encoder;

user input captured by means of an input unit;

a reference object identified using image analysis on several images of a location represented on the floor plan.

13. The tool of claim 11, wherein the pairing unit performs at least one of the following:

minimizing a difference in length between the two paired walls;

minimizing a displacement of the partial floor plans;

minimizing an overlap of the partial floor plans;

minimizing a gap between the partial floor plans;

maximizing the number of paired walls;

maximizing an alignment of doors or interior openings present in two paired walls;

favoring or forcing the pairing of two walls selected by means of an input unit;

disfavoring or preventing the pairing of two walls selected by means of an input unit; and maximizing a fitness function combining several of the above.

14. The tool of claim 11, wherein the assembly unit makes the partial floor plans more compatible by further performing at least one of the following:

translating a wall, a door, or an opening;

rotating a wall, a door, or an opening;

scaling a wall, a door, or an opening;

changing a property of a wall, a door, or an opening;

inserting a wall, a door or an opening; and removing a wall, a door or an opening.

15. The tool of claim 11, wherein the device further comprises a communication unit for performing portions of at least one of the following computations on a remote computer:

positioning the partial floor plans relatively one to another;

pairing a wall of one of the partial floor plans with a substantially aligned and substantially close wall of another partial floor plan;

computing an optimized orientation of the paired walls by minimizing an angle between the paired walls and rotating both paired walls to the optimized orientation;

computing an optimized position of the paired walls by minimizing a distance between the paired walls and translating both paired walls to the optimized position;

computing an optimized length of the paired walls by minimizing a distance between the extremities of the paired walls and setting the length of both paired walls to the optimized length; and assembling the partial floor plans into a combined floor plan.

* * * * *